R. Deering, Sr.,
Water Wheel,
N° 12,346.    Patented Feb. 6, 1855.

UNITED STATES PATENT OFFICE.

RICHARD DEERING, SR., OF LOUISVILLE, KENTUCKY.

CURRENT WATER-WHEEL.

Specification of Letters Patent No. 12,346, dated February 6, 1855.

*To all whom it may concern:*

Be it known that I, RICHARD DEERING, Sr., of Louisville, in Jefferson county and State of Kentucky, have invented a new and useful Improvement in Portable Water-Powers; and I do hereby declare the following to be a full, clear, and exact description thereof, reference being had to the accompanying drawing, which forms part of this specification, in which—

Figure 1:
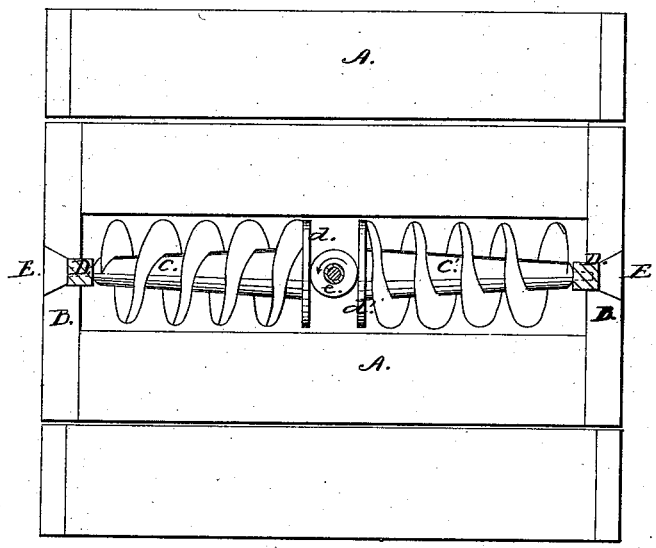
Figure 2:
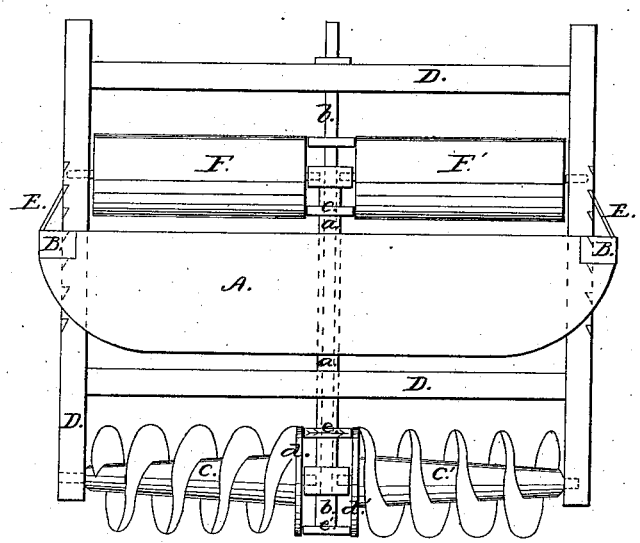

Figure 1, is a plan of the vessel and screw, the upper part of the framing, &c., being removed. Fig. 2, is a side elevation showing the water wheel and framing in which it is supported lowered down.

The object of this invention is to furnish a portable water power connected with a scow or vessel, so that it may be transported from place to place, and anchored in any current; in such form that the power of the current may be made available for removing sand bars in rivers, for sawing, planing, grinding, or any other purpose for which a portable power on rivers might be required, or applicable.

To enable others to make and use my invention I will proceed to describe its construction and operation.

(A) represents a scow or vessel constructed in two parts, and braced together side by side, with suitable cross ties (B), sufficient space being left between them for the screw water wheels ($c$, $c'$,) to revolve freely; these wheels are supported in bearings in the frame (D), near its lower extremity, and will be hereinafter more fully described. The frame (D) which affords journal bearing for the water wheels, and all other machinery that may be used, is so arranged in connection with the vessel, that it may be raised or lowered at pleasure, by means of racks and pinions at each end, or any other suitable power, and is supported on pawls (E) attached to the cross-ties (B), at either end of the vessel; when used as a dredge, this admits of the elevating machinery being adjusted to any depth of water, so that it may commence operation on the top of a sand bar and be gradually lowered to the required depth, by which means the water wheels will always have the full benefit of the current, without being sheltered by the sand bar; also of being lowered in case of freshet, so that no delay or hindrance would be occasioned thereby; and to keep them out of the way of drift wood, which might otherwise injure them, and prevent their operation; and when used for any other purpose, the wheel may be fixed at any distance below the surface of the water, at which they will develop the greatest power of the current.

The screw water wheels (C C′) are constructed with conical shafts or centers, the large ends of each, being set toward each other, and would commonly be made of wood with iron journals at each end; the worm or screw around them is of equal diameter from end to end, and is made concave on the side receiving the pressure of the current, with a small flange on the edge also turned toward the current, this concavity in connection with the flanged edge, is for the purpose of retaining the water as much as possible on the screw, which would otherwise tend to fly off at the periphery, and as the power of the current on the screw will gradually lessen as it progresses, the conical center will throw it toward the periphery of the screw, where its remaining force would be most available; the second screw wheel (C′) is in every respect the reverse of the first, the one being right handed, the other left, the concave side and flanged edge of the screw in the second, being toward the base of the conical center, and said base toward the first screw and the current; the power of the current being mainly developed by the first screw, it has a free escape down the tapering center of the second, putting it in motion in the contrary direction. At the inner end of each of these screws are wheels ($d$ $d'$) attached to the base of the conical centers, they are of equal diameter with that of the screws; the rims of these wheels afford friction bearing to the periphery of two rollers ($e$ $e'$), and through which the power of the screws is communicated, to any machinery above; the second screw wheel must be supported endwise at its tail end, in a toe bearing or step, and the first being forced endwise by the current, bears hard against the friction rollers ($e$ $e'$), which are supported by the wheel ($d'$) on their opposite side; the upper friction roller ($e$) is fast on a hollow vertical shaft ($a$), and the lower one ($e'$) is attached to a solid shaft ($b$), passing freely through the hollow shaft ($a$). The two screw wheels revolving in opposite directions, cause the rollers to revolve by friction on their peripheries, the one ($e$) above the center of the screws will revolve in the direction indicated by the arrow, while the other (e') will revolve in the contrary direction. If a vertical application of power is required, it may be taken direct from the vertical axis of either of these friction rollers; if a horizontal rotation is necessary, it must be obtained by other friction rollers (c c') above deck, one on the hollow, the other on the solid shaft, operating on drums (or wheels) (F F') as represented in Fig. 2, or by bevel gearing.

The drums (F F') when provided with suitable prongs or teeth on their periphery to lock into an endless chain, would be applicable for operating the elevating buckets, used for dredging purposes, the sand or mud raised by them, being delivered on deck, or into scows or vessels along side.

What I claim as new and desire to secure by Letters Patent is—

1. The concave flanged screw in combination with the conical body or center, as and for the purposes set forth.

2. Also the arrangement herein described, of hanging the water wheels and other machinery in framing, adjustably connected with the vessel or scow, whereby they may be raised or lowered for the purposes specified.

In testimony whereof, I have hereunto subscribed my name this   day of October 1854.

RICHARD DEERING, SENIOR.

Witnesses:
A. GREGORY,
WM. M. SMITH.